March 18, 1924.
G. B. STILLWAGON
1,487,079
COMBINED SHEET SEVERING AND FASTENING DEVICE
Filed June 26, 1923   3 Sheets-Sheet 3
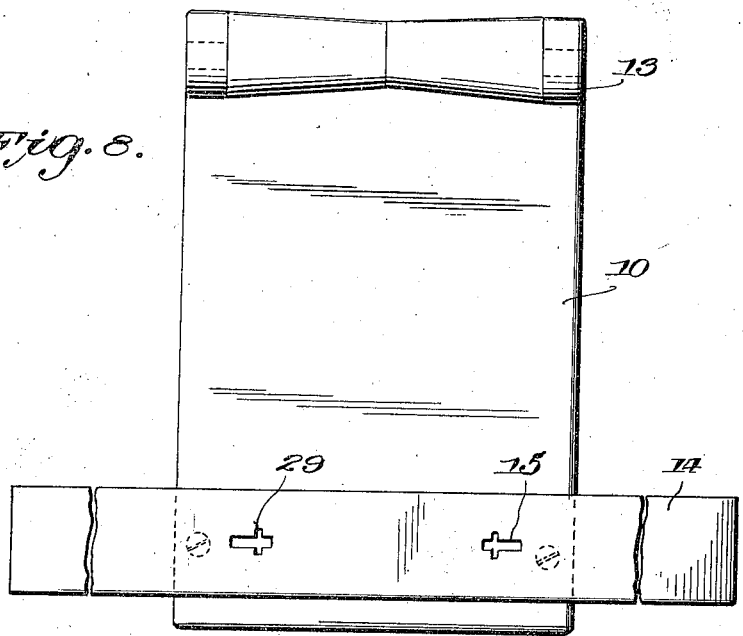
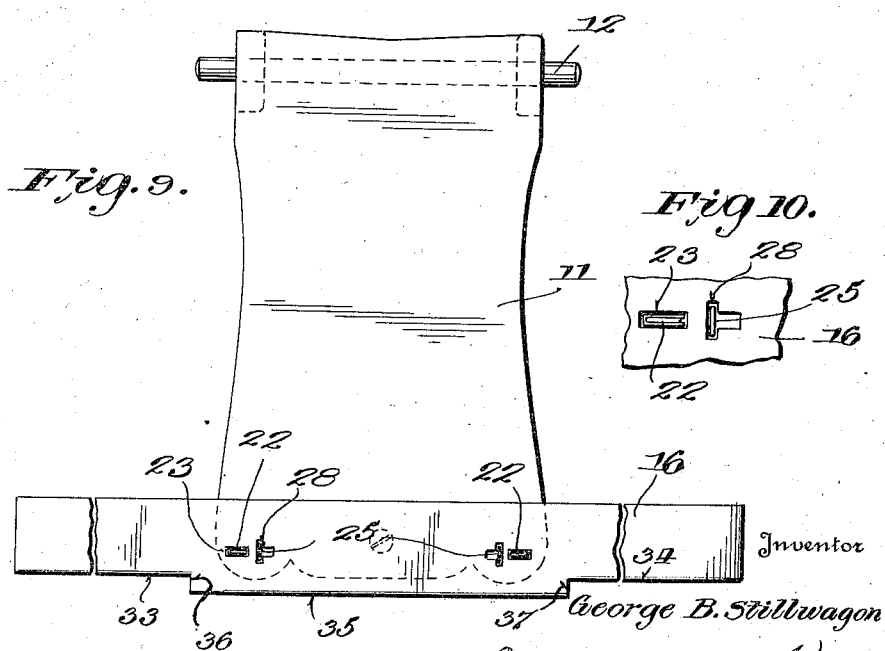

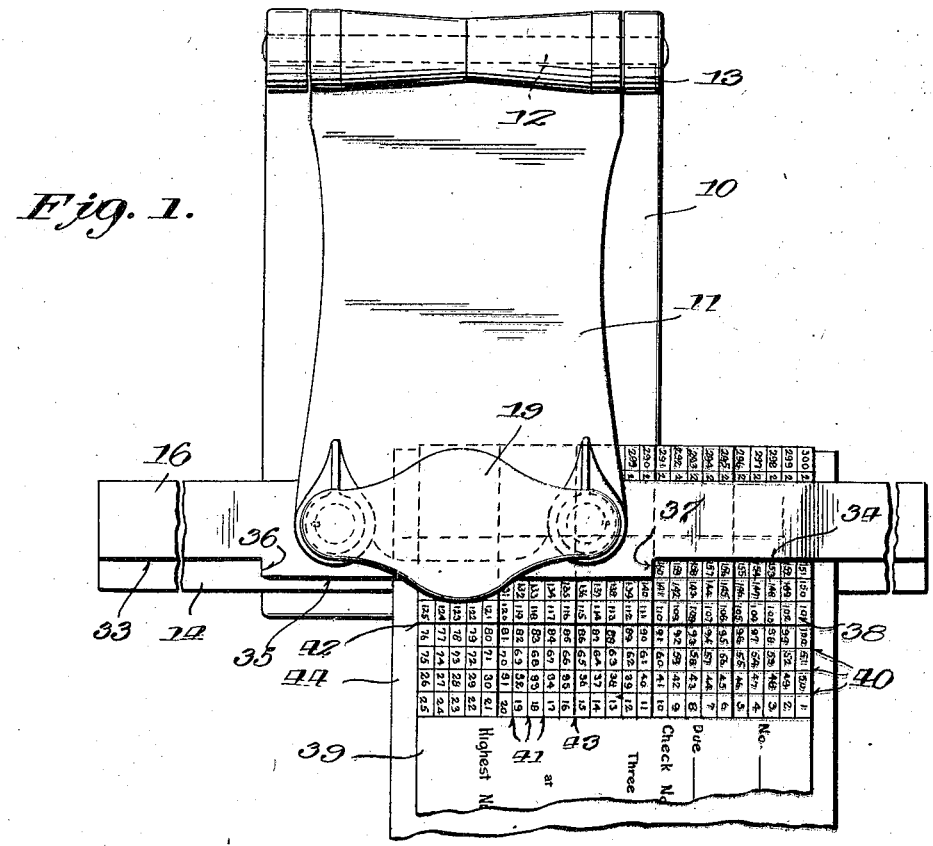

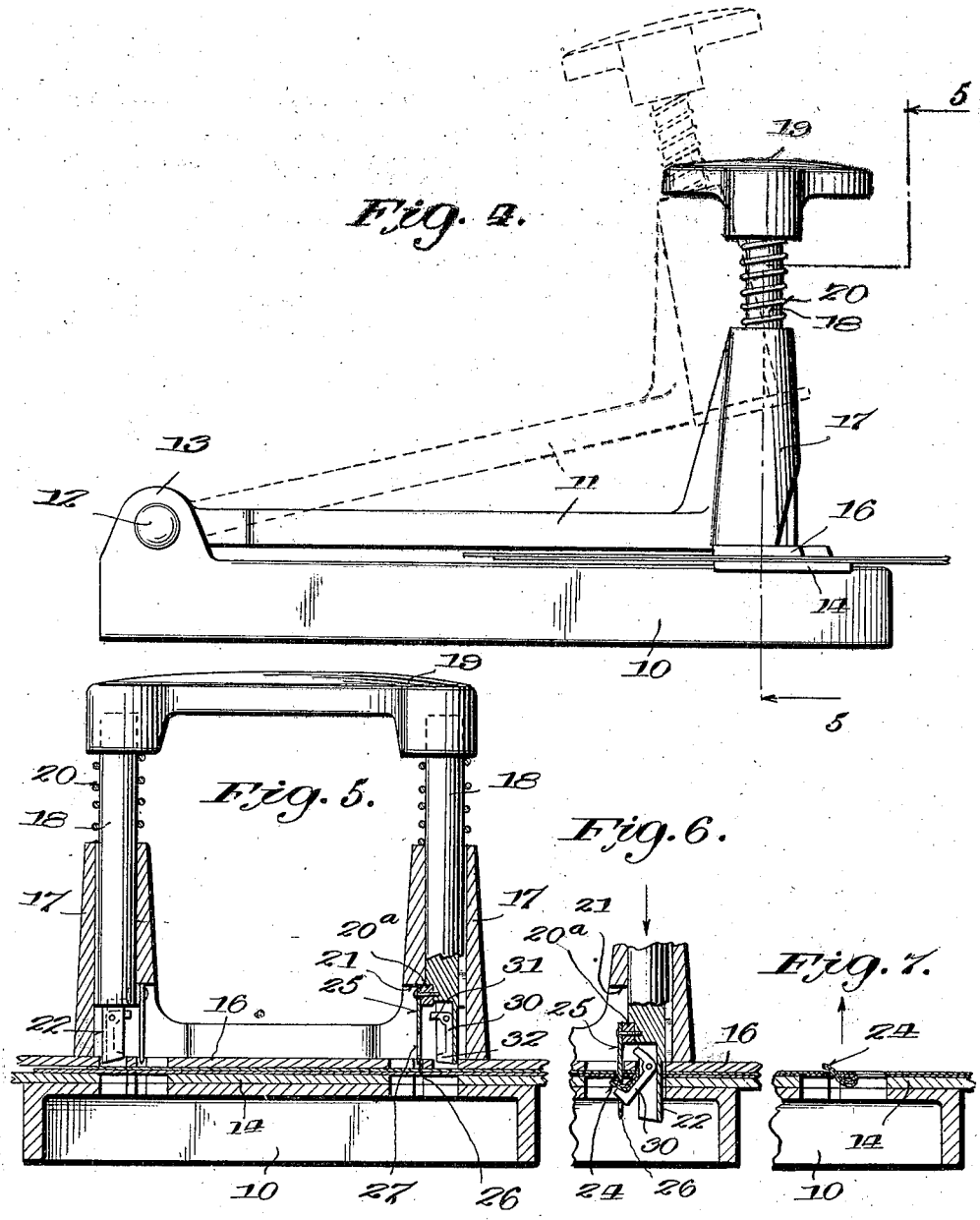

Patented Mar. 18, 1924.

1,487,079

UNITED STATES PATENT OFFICE.

GEORGE B. STILLWAGON, OF REDSTONE TOWNSHIP, FAYETTE COUNTY, PENNSYLVANIA.

COMBINED SHEET SEVERING AND FASTENING DEVICE.

Application filed June 26, 1923. Serial No. 647,885.

*To all whom it may concern:*

Be it known that I, GEORGE B. STILLWAGON, a citizen of the United States, residing at Redstone Township, county of Fayette, and State of Pennsylvania, have invented certain new and useful Improvements in Combined Sheet Severing and Fastening Devices; and I do hereby declare the following to be a full, clear, and exact description of the invention, such as will enable others skilled in the art to which it appertains to make and use the same.

This invention relates to a combined sheet severing and fastening device, and has for its general object the provision of such a device adapted particularly for use as an account scoring and ticketing device in accurately severing from a commercial instrument of the type having running indicia of purchasing values, that portion required to score the payment of a given purchase and in ticketing a sales memorandum slip or the like with the severed portion as a record of the payment.

While my novel device is capable of other uses as a combined sheet severing and fastening device, it is, as stated, particularly adapted for the use referred to in connection with the handling of commercial transactions employing a commercial instrument of the type mentioned as a medium of payment. A commercial instrument of this type is disclosed and claimed in my prior Patent 1,389,849, granted September 6, 1921, and as the principles of my novel device are aptly illustrated in its uses with such an instrument, reference will primarily be made thereto, for the sake of a concrete example, in explaining my invention. It is to be understood, however, that such example is merely illustrative and that the novel device both in the specific embodiment later to be described and in various other embodiments within the broad scope of the invention is capable of other uses than that of the concrete example given.

The commercial instrument of my prior patent is of the type generally known as a company store check having a face value payable in merchandise, with provision for deducting amounts of purchases less than the total value of the check in such a manner as to clearly indicate the amount still remaining thereon to the credit of the owner of the check. In the particular form of store check shown in my prior patent, the check is provided with a number of horizontal and vertical intersecting lines which form columns of spaces in which numbers are printed, running in successive order from 1 up to and including the number, in cents, that corresponds to the face value of the check. The highest number is disposed in a terminal column arranged adjacent one edge of the sheet and the numbers decrease from the highest through the terminal column and therefrom through successive columns parallel to the terminal column with the numbers running through adjacent columns in decreasing order in opposite directions so that the lowest number in each column is immediately adjacent the highest number in the next succeeding column, this arrangement enabling the store clerk to sever from the check for each purchase a single piece bearing the numbers which are the equivalent of the amount of the purchase even when such numbers run from one column to the next, leaving the unused balance only in the hands of the owner of the check.

One important advantage afforded by the store check of my prior patent over the type of store checks in use prior thereto requiring punch marks or the like to be made upon the face of the check to indicate the unused balance, is the elimination of fraudulent use of the check by the filling in of the punch marks to represent the check at its full face value. Heretofore the only practically feasible way of handling a store check of the type of that disclosed in my prior patent, however, presented the disadvantage, common to the use of the earlier types of store checks, of not affording a record of the purchases made together with the payments therefor. This disadvantage is inherent in the earlier types of store checks referred to as requiring punch marks or the like to indicate the unused balance, due to the fact that while those marks, as long as they remained upon the face of the check, presented a record of the number and amounts of payments made, that record gave no indication of what the payments were for. In the handling of store checks of the type disclosed in my prior patent, it has been the customary practice to entirely discard the payment portions severed from the check due to the extreme inconvenience and difficulty of mounting these severed portions, often of very small size, upon a larger blank upon which the customer's name and purchase could be recorded; such inconvenience and difficulty making it practically impossible to prepare a record of the purchase and payment during the handling of the transaction.

Accordingly, a particular object of my invention is to provide an operating appliance or device enabling the ready and immediate handling of store checks of the type disclosed in my prior patent together with sales memoranda slips or the like in such a manner as to accurately sever the payment portion from the store check and to attach that portion to the sales memorandum in one continuous and rapid operation, thus producing a record of the purchase and payments from the check, and enabling the immediate return of the check to its owner with only the unused balance thereon.

The foregoing and further objects and the novel features of the invention will be apparent from the following description of an illustrative embodiment of the principles of the invention in a specific construction adapted particularly for the use referred to in connection with the handling of commercial transactions employing the store check of my prior patent.

In the accompanying drawings, forming a part of this specification;

Fig. 1 is a top plan view of my novel operating appliance or device with the salesman's memorandum slip and customer's store check shown inserted therein in back-to-back relation and with the store check in position for the attachment of a payment portion to the memorandum slip and the severance of the check along the boundary lines between the payment portion and the unused balance so as to return the unused balance of the check to the customer;

Fig. 2 is a view of the back of the sales slip, partly broken away, with the severed payment portion of the store check attached thereto;

Fig. 3 is a face view of the sales slip, partly broken away;

Fig. 4 is a side elevational view of my novel operating appliance or device, and showing in full and dotted lines two positions of a hand operated part, with relation to the base member of the device;

Fig. 5 is a front elevational view of the device as a whole but with certain parts shown in section along the line 5—5 of Fig. 4 looking in the direction of the arrows, and showing in the sectioned portion certain operating parts of the paper fastening mechanisms;

Fig. 6 is a detailed sectional view, also approximately along the line 5—5 of Fig. 4, showing the parts of the paper fastening mechanisms in an intermediate position of their operation;

Fig. 7 is a detailed sectional view showing the paper fastening operation completed and the check attached to the sales slip;

Fig. 8 is a top plan view of the base member of the device with the hand operated member which bears the movable parts of the fastening mechanisms removed therefrom;

Fig. 9 is a plan view of the hand operated member detached from the base member, the view being of that face of the hand-operated member next to the base member when the parts are assembled in working relation; and Fig. 10 is an enlarged partial plan view to present a clearer showing of certain details of the hand operated member than shown in Fig. 9.

Viewing the novel device (for the purpose of generally illustrating the principles of the invention) in relation to its use in handling a store check and sales slip in the manner hereinbefore stated, it may be said that the device comprises opposed jaw members bearing the check and slip attaching mechanism and an edged guide element enabling the operator to properly locate the check between the jaw members for the attachment of the payment portion only of the check to the slip and to accurately sever the check along the boundary line between the payment portion and the unused balance so as to leave the payment portion on the sales slip as a record of the payment and to return the check to its owner with the unused balance only thereon.

In the specific embodiment of the invention illustrated in the drawings, 10 and 11 indicate the two relatively movable jaw members referred to. The member 10 is of relatively heavy construction to function as a stationary base member and the member 11 is pivoted or hinged thereto to function as a movable jaw member, trunnions 12 being provided upon the member 11 and being journaled in lugs 13 upstanding from the base member 10.

An elongated bearing and supporting plate 14, preferably of steel, having a flat, hard and smooth surface, is mounted upon the front portion of the top face of the base member 10 to extend transversely thereover and beyond the sides of the base member as shown in Fig. 8, the plate 14 having straight-edged apertures 15 extending therethrough for the passage of the moving parts of the paper fastening mechanism, the edges of the apertures also functioning in cooperation with the punching and cutting parts of the mechanism, in the manner hereinafter described. A plate 16 of the same characteristics of material and surface is mounted upon the opposed face of the upper jaw member 11, in position, when the upper jaw member is closed upon the lower, to bear upon the plate 14, the two plates cooperating, when the papers to be handled are inserted between the jaw members, to engage and grip the papers between them, the firmness of the grip being increased by downward pressure upon the handle part of the upper jaw member, later to be referred to. The plate 16, as will hereinafter be more fully set forth, performs additional functions as a guide element and straight-edge for locating the check between the jaw members in the required position to attach the payment portion of the check to the sales slip and to enable the operator to tear off the unused balance of the check.

The moving parts of the paper fastening mechanism which I preferably employ in my novel device are mounted upon the upper jaw member 11. Upstanding from the front top portion of the member 11 are two hollow standards 17, one adjacent each of the two front corners of the member 11, in which are slidably mounted the rods 18, to which the upper ends of which the cross bar 19 forming the handle part of the device is affixed. A coiled spring 20 surrounds each rod 18 with the lower end of the coil supported upon the upper end of a standard 17 and the upper end of the coil engaging beneath the handle bar 19, this arrangement providing for a spring mounting for the handle resiliently holding it in its uppermost or non-operating position, that position of the handle being determined by the engagement of blocks 20ª, mounted on the rods 18, with a wall 21 of a cut-out portion of each of the standards 17, as shown in Figs. 5 and 6.

The lower end of each rod 18 is formed into a hollow punch 22 of substantially the contour in end view shown in Fig. 10 where the end of the punch is seen through the aperture 23 in the plate 16, the punch having three vertically extending side walls forming right angles between them and one open side. This punch, upon the downward stroke of the handle bar 19, moves downwardly through the aperture 23 in the upper plate 16, and, in cooperation with the longitudinal side edges of the apertures 15 in the lower plate 14 through which apertures the punch continues its movement, is designed to punch from the papers placed between these plates, a tongue 24 (see Figs. 6 and 7).

Mounted upon each rod 18, in this instance by way of said block 20ª, and spaced laterally of the punch 22, is a blade 25, the blade depending vertically from the block and having a sharpened terminal 26 and immediately thereabove a rectangular aperture or eye 27. The blade is thus designed, upon downward movement, to form a slit-like aperture in the papers clamped between the plates 14 and 16, and upon continuation of its downward stroke to present the eye in position to receive therethrough the tongue formed by the punch, and upon its upward or return stroke to draw the tongue through the slit into inter-locked relation therewith. In its downward and return stroke, the blade moves through the cross slits of the apertures 28 in the upper plate 16 (see Fig. 10) and through the cross slits 29 of the apertures 15 in the lower plate (see Fig. 8).

Pivotally mounted within the punch 22 is a tucker element 30 having a long arm depending vertically from its pivot in the position of the parts at rest, as shown in Fig. 5, and upper and lower fingers 31, 32, respectively, extending at right angles from the arm, the upper finger being positioned, upon the downward stroke of the punch carrying the tucker element with it, to engage the plate 16 at the edge of the aperture 23 through which the punch moves, such engagement swinging the tucker element as shown in Fig. 6 to cause the lower finger to advance the tongue of the paper into the eye of the blade 25. Thereupon, the return strokes of the blade, the punch and the tucker element take place, the blade drawing the tongue punched from the papers through the slit in the papers, thus locking the plies together, as shown in Fig. 7.

The plate 16 is designed to not only function in the manner hereinbefore described, but also constitutes a simple and convenient form of straight-edge to locate the store check with the sales slip between the jaw members in the proper position to present the payment portion only of the check to the mechanism attaching it to the sales slip and thereafter, while the check and sales slip are still clamped in the device, to enable the operator to properly tear the check along lines leaving only the payment portion attached to the sales slip and enabling the return of the check to the owner with the unused balance only thereon.

To enable the plate 16 to be thus employed, it is provided with two longitudinal cutting or tearing edges 33, 34, (see Figs. 1 and 9) in alignment but separated by a forward offset portion of the plate, a like longitudinal edge 35 parallel to the edges 33, 34 but upon the offset portion of the plate, and two transverse edges 36, 37, defining the shoulders of the offset portion of the plate and extending substantially at right angles to the longitudinal edges referred to, the offset portion being of a width to exactly span the width of a column of figures on the store check.

Other forms of straight-edge may, of course, be employed, to adapt my novel appliance to different uses than the one here more particularly referred to, the straight-edge, as shown in Fig. 9, being screw mounted on the jaw member 11, so as to be replaceable. In the use of my appliance in the handling of the store check of my prior patent, however, the straight-edge here shown is preferably used.

As shown in Fig. 1 the upper plate 16, which functions as the straight edged element, is of less width than the lower plate 14, and as shown in Fig. 4, the straight edges of this plate 16 are slightly beveled to present a sharp cutting edge immediately adjacent the lower plate 14, this arrangement providing for effective cooperation of the lower plate, as a supporting table or bearing surface, with the upper plate as the straight-edge element.

The illustrative use of my novel device is shown particularly in Figs. 1 and 2. The store check for use with which the specific form of the invention here chosen for purposes of illustration is adapted is indicated as a whole by the numeral 38 and in this instance is identical with the store check of my prior patent, a portion 39, at one end, being provided with a space to receive printing or writing identifying the store issuing the check, the owner, date of issue of the check etc. and the remaining portion having numerals running from 1 to 300 in columns over the face of the check in the manner hereinbefore described. On the check illustrated in Fig. 1, the two sets 40 and 41, of horizontal and vertical relatively light, parallel and equally spaced lines, define the spaces and columns for the numbers, while the heavier and more widely spaced horizontal and vertical lines 42, 43, divide the numbers along each column into groups of five, representing nickels, and over a plurality of successive columns into larger groups of hundreds representing dollars, this arrangement enabling the clerk handling the check to quickly and accurately locate the amount on the check which would represent the unused balance after payment of any given purchase and hence to determine the extent of the portion to be severed from the check in payment of that purchase.

Assuming that a check for the full value has been presented for the deduction of payment for the purchase amounting to one dollar and forty cents recorded on the face of the sales memorandum slip 44 as shown in Fig. 3, and it is desired to deduct the amount of that purchase from the customer's store check and to record the payment from the store check upon the sales slip, the store check is placed upon the sales slip, preferably, although not necessarily, upon the back of the slip, and the two inserted between the jaw members of the device with the face of the store check uppermost, the movable jaw member being elevated to open position to permit a ready insertion. The movable jaw member is then lowered to bring the straight-edge 16 into proximity to the face of the check, and the check, together with the underlying sales slip, set in the required position, using the the straight-edge as a guide, to attach the payment portion of the check to the sales slip and thereafter to tear off the unused balance of the check. In the assumed example of a purchase amounting to one dollar and forty cents and the equivalent of that amount required to be deducted from the store check in payment, the check showing an unused credit balance of, say, three dollars, will be set, as illustrated in Fig. 1, with the edge 37 of the plate 16 immediately below the number 160 on the store check representing the amount of the balance that should remain after deducting the amount of the purchase, the edge 34 on the rear boundary line separating the payment portion from the column containing the number 160 and the edge 35 on the advanced boundary line of that column to cover the portion of the column up to the number 160 going with the payment portion of the check, as shown in Fig. 1. The store check and sales slip having thus been set, a quick downward stroke of the handle 19 operates the fastener mechanism in the manner hereinbefore described to attach the payment portion of the store check to the sales slip. While the handle 19 is still depressed, the unused balance of the store check is then detached by grasping the projecting head portion of the check and tearing it off along the sharp edges of the plate 16, after which the handle 19 is released and the sales slip with the attached payment portion of the check removed from between the jaw members. Fig. 2 represents the payment portion of the store check, in the assumed example, attached to the back of the sales slip 44, the tongue 24 punched up from the check and sales slip being shown projecting from the front of the plies through the slit to the rear thereof.

It is to be observed that in the set position of the check and sales slip in the assumed example, but one tongue-and-slit interlock is made between them. This is generally found sufficient to retain the attachment of the payment portion of the check to the sales slip. However, if desired, after the first attaching operation of the device with the check and sales slip set in the required position and the unused balance of the check has been detached, the sales slip with the payment portion of the check attached thereto may be moved to other positions between the jaw members and additional attachments made, two additional attachments so made being shown in Fig.

2. It will also be understood that in certain payment deductions from the store check, the required setting of the check will extend the payment portions beneath both attaching mechanisms so that two attachments are simultaneously formed.

When the store check, used as in the example given, is again presented for payment of a purchase, it is handled, together with the sales slip for the new purchase, in substantially the same manner as before, it being understood, of course, that in certain payment deductions to be made from the store check the required setting of the check will position the same under the left hand portion of the plate or straight-edge 16 (as the parts are viewed in Fig. 1), so that the straight edges 33, 36 and 35 will function in guiding the setting of the check and in the tearing off of the unused balance.

The foregoing example of use of my novel device with the store check of my prior patent is given merely as illustrative, and it is to be understood that the device is not limited to use with a store check of the type of my prior patent but is of general applicability wherever a portion of a check, ticket or the like is to be detached and the detached portion attached to a memorandum of sale or the like.

What is claimed is:

1. In a device of the class described, in combination, opposed members mounted for relative movement in approaching and retreating directions to closed and open positions and adapted in closed position to engage and hold between them a plurality of superposed sheets of paper or the like, paper fastening mechanism carried by said members, and a paper severing edge upon one of said members.

2. In a device of the class described, in combination, opposed members mounted for relative movement in approaching and retreating directions to closed and open positions and having terminal portions providing in the open position of said members an entrance-way for the insertion of superposed sheets of paper or the like between said members, paper fastening mechanism carried by said members, and a straight-edge mounted on the terminal portion of one of said members.

3. In a device of the class described, in combination, opposed jaw members relatively movable to open and closed position and having terminal portions providing in the open position of said jaw members an entrance-way for the insertion of superposed sheets of paper or the like between said jaw members, paper fastening mechanism carried by said jaw members, one of said jaw members having its terminal portion provided with a paper severing edge.

4. In a device of the class described, in combination, opposed jaw members relatively movable to open and closed positions and having terminal portions providing in the open position of said jaw members an entrance-way for the insertion of an end portion of superposed sheets of paper or the like between said jaw members, manually operable paper fastening mechanism carried by said jaw members and adapted upon operation to attach together the inserted portions of said sheets, one of the terminal portions of said jaw members being provided with a straight-edge enabling the severance of the outer portion of a sheet from its inserted portion.

5. In a device of the class described, in combination, opposed members mounted for relative movement in approaching and retreating directions to closed and open position and having terminal portions providing in the open position of said members an entrance-way for the insertion of an end portion of superposed sheets of paper or the like between said members, manually operable paper fastening mechanism carried by said members, and a sheet-insertion guide mounted on the terminal portion of one of said members, said guide having a tearing or cutting edge enabling division of any of said sheets into separate portions of an extent depending upon the extent and position of insertion of said sheets with respect to said guide.

6. In a device of the class described, in combination, opposed members mounted for relative movement in approaching and retreating directions to closed and open position and having opposed terminal portions providing in the open position of said members an entrance-way for the insertion of an end portion of superposed sheets of paper or the like, manually operable paper fastening mechanism carried by said members and adapted upon operation to attach together the inserted portions of said sheets, said opposed terminal portions of said members being provided with a bearing plate and a paper severing edge, respectively, engaging the sheets of paper between them in the closed position of said members.

7. In a device of the class described, in combination, two opposed jaw members relatively movable to open and closed position and adapted in their open position for the insertion therebetween of an end portion of superposed sheets of paper or the like and in their closed position to clamp said papers between them, manually operable paper fastening mechanism having cooperating parts mounted on respective jaw members and enabling operation of said mechanism only in the closed position of said jaw members, the terminal portion of one of said jaw members being provided with an edge enabling the severance of an outer portion of a sheet from its inserted portion while said jaw members are closed.

8. In a device of the class described, in combination, opposed jaw members relatively movable to open and closed position and adapted in their open position for the insertion of an end portion of supersposed sheets of paper or the like, fastening mechanism carried by said jaw members and adapted to be manually operated to attach the inserted portion of said sheets together, handle means for opening and closing said jaw members and for operating said fastening mechanism, and a straight-edge on one of said jaw members in position when said jaw members are closed enabling the operator to tear off the outer from the inserted position of one of said sheets.

9. In a device of the class described, in combination, manually operable clamping means comprising opposed members relatively movable to closed and open position enabling the insertion between them in their open position of an end portion of superposed sheets of paper or the like and adapted in their closed position to apply a clamping pressure to the inserted end portion of said sheets, paper fastening means adapted and arranged to operate upon the inserted end portion of said sheets and sheet severing means enabling the severing of the outwardly projecting portion of a sheet from its inserted portion while said sheets are under clamping pressure.

10. A device of the class described comprising, in combination, a base member, a clamping member mounted thereabove for movements to closed position thereon and to open position with respect thereto, said open position enabling the insertion between said members of an end portion of superposed sheets of paper or the like, manually operable paper fastening mechanism comprising cooperating moving and stationary parts mounted on said clamping member and base member, respectively, a handle part spring-mounted on said clamping member, said handle part being adapted by downward pressure exerted thereon against the tension of said spring to apply a clamping pressure to sheets of paper inserted between said base and clamping members, motion transmitting means between said handle part and the moving parts of said fastening mechanism adapted upon a downward stroke of said handle part to effect operation of said fastening mechanism, said clamping member being provided with a paper severing edge positioned to enable the operator to tear off the portion of an inserted sheet projecting outwardly beyond said clamping member.

11. In a device of the class described, in combination, an elongated base member extending from the front to the rear of said device, an opposed clamping member mounted above the front portion of said base member for movement downwardly to operative clamping position thereon and upwardly to inoperative or open position, an element having a paper-severing edge projecting forwardly from one of said members, manually operable paper fastening mechanism comprising stationary parts and parts moving in the operation of said mechanism, said stationary parts mounted in said base member and said moving parts mounted thereabove for movement toward said base member into operating relation with said stationary parts and to an inoperative position spaced from said base member, thereby, when said clamping member and moving parts of said fastening mechanism are in said inoperative positions, enabling the insertion of an end portion of superposed sheets of paper or the like from the front toward the rear between said base and clamping members to a position enabling attachment of said sheets together, and handle means for moving said clamping member and moving parts of said fastening mechanism to operative positions and to operate said fastening mechanism.

12. An implement enabling the handling of a sales memorandum slip or the like and a store check of the character described, comprising, in combination, a base, a member mounted thereabove for movements to closed position thereon and to open position with respect thereto, a straight edge mounted on said member and having two aligned longitudinal edges, an intermediate parallel longitudinal edge offset therefrom a distance equaling the width of a column on said store check, and two transverse edges at right angles to and joining said aligned and offset longitudinal edges, manually operable paper fastening mechanism comprising cooperating parts mounted on said member and base respectively, and handle means mounted on said member adapted in the closed position of said member to operate said paper fastening mechanism, said straight edge projecting from said member in position enabling the setting of said store check, face uppermost and superposed on said sales slip, between said base and member in position enabling attachment of its payment portion to said sales slip by operation of said fastening mechanism and the severing of the unused balance from said payment portion by one stroke or pull upon the projecting end of said check.

In testimony whereof I hereunto affix my signature.

GEORGE B. STILLWAGON.